United States Patent [19]

Coe et al.

[11] Patent Number: 5,152,813

[45] Date of Patent: Oct. 6, 1992

[54] NITROGEN ADSORPTION WITH A CA AND/OR SR EXCHANGED LITHIUM X-ZEOLITE

[75] Inventors: Charles G. Coe, Macungie; John F. Kirner; Ronald Pierantozzi, both of Orefield; Thomas R. White, Allentown, all of Pa.

[73] Assignee: Air Products and Chemicals, Inc., Allentown, Pa.

[21] Appl. No.: 811,404

[22] Filed: Dec. 20, 1991

[51] Int. Cl.⁵ .............................................. B01D 53/04
[52] U.S. Cl. .......................................... 55/26; 55/58; 55/62; 55/68; 55/75
[58] Field of Search .................. 55/25, 26, 58, 62, 68, 55/75, 389

[56] References Cited

U.S. PATENT DOCUMENTS

| | | | |
|---|---|---|---|
| 2,882,244 | 4/1959 | Milton | 55/75 X |
| 2,951,552 | 9/1960 | Cannon | 55/58 |
| 2,988,503 | 6/1961 | Milton et al. | 55/75 X |
| 3,140,931 | 7/1964 | McRobbie | 55/25 |
| 3,140,932 | 7/1964 | McKee | 55/68 |
| 3,140,933 | 7/1964 | McKee | 55/68 |
| 3,155,468 | 11/1964 | de Montgareuil et al. | 55/58 X |
| 3,280,536 | 10/1966 | Berlin | 55/58 |
| 3,282,028 | 11/1966 | Berlin | 55/75 X |
| 3,313,091 | 4/1967 | Berlin | 55/58 |
| 3,446,645 | 5/1969 | Drost | 55/389 X |
| 4,013,429 | 3/1977 | Sircar et al. | 55/68 X |
| 4,322,394 | 3/1982 | Mezey et al. | 55/208 X |
| 4,477,267 | 10/1984 | Reiss | 55/75 X |
| 4,481,018 | 11/1984 | Coe et al. | 55/68 |
| 4,544,378 | 10/1985 | Coe et al. | 55/68 |
| 4,557,736 | 12/1985 | Sircar et al. | 55/62 |
| 4,606,899 | 8/1986 | Butter et al. | 423/328 |
| 4,685,939 | 8/1987 | Kratz et al. | 55/75 X |
| 4,756,723 | 7/1988 | Sircar | 55/58 X |
| 4,810,265 | 3/1989 | Lagree et al. | 55/75 X |
| 4,859,217 | 8/1989 | Chao | 55/68 |
| 4,925,460 | 5/1990 | Coe et al. | 55/75 X |
| 5,015,271 | 5/1991 | Reiss | 55/58 X |
| 5,074,892 | 12/1991 | Leavitt | 55/58 X |
| 5,084,075 | 1/1992 | Sircar | 55/58 X |

FOREIGN PATENT DOCUMENTS 1580928 12/1980 United Kingdom .

OTHER PUBLICATIONS

Kuhl; "Crystallization of Low-Silica Faujasite"; *Zeolites;* (1987) 7, p. 451.

Herden, et al.; "Investigation of the Arrangement & Mobility of Li Ions in X- and Y-Zeolites & the Influence of Mono- and Divalent Cations On It"; *J. Inorg. Nuclear Chem.;* vol. 43, No. 10, pp. 2533-2536 (1981).

*Primary Examiner*—Robert Spitzer
*Attorney, Agent, or Firm*—Geoffrey L. Chase; James C. Simmons; William F. Marsh

[57] ABSTRACT

The present invention is directed to a process for separating nitrogen from gas mixtures containing nitrogen and less strongly adsorbed components such as oxygen, hydrogen, argon or helium by use of an at least binary exchanged X-zeolite having lithium and calcium and/or strontium ions in ratio of preferably 5% to 50% calcium and/or strontium and 50% to 95% lithium.

19 Claims, 9 Drawing Sheets

BINARY N₂/O₂ SELECTIVITY FOR AIR FEED AT 1.45 atm AT 30°C FOR MIXED CATION (Ca,M) LSX

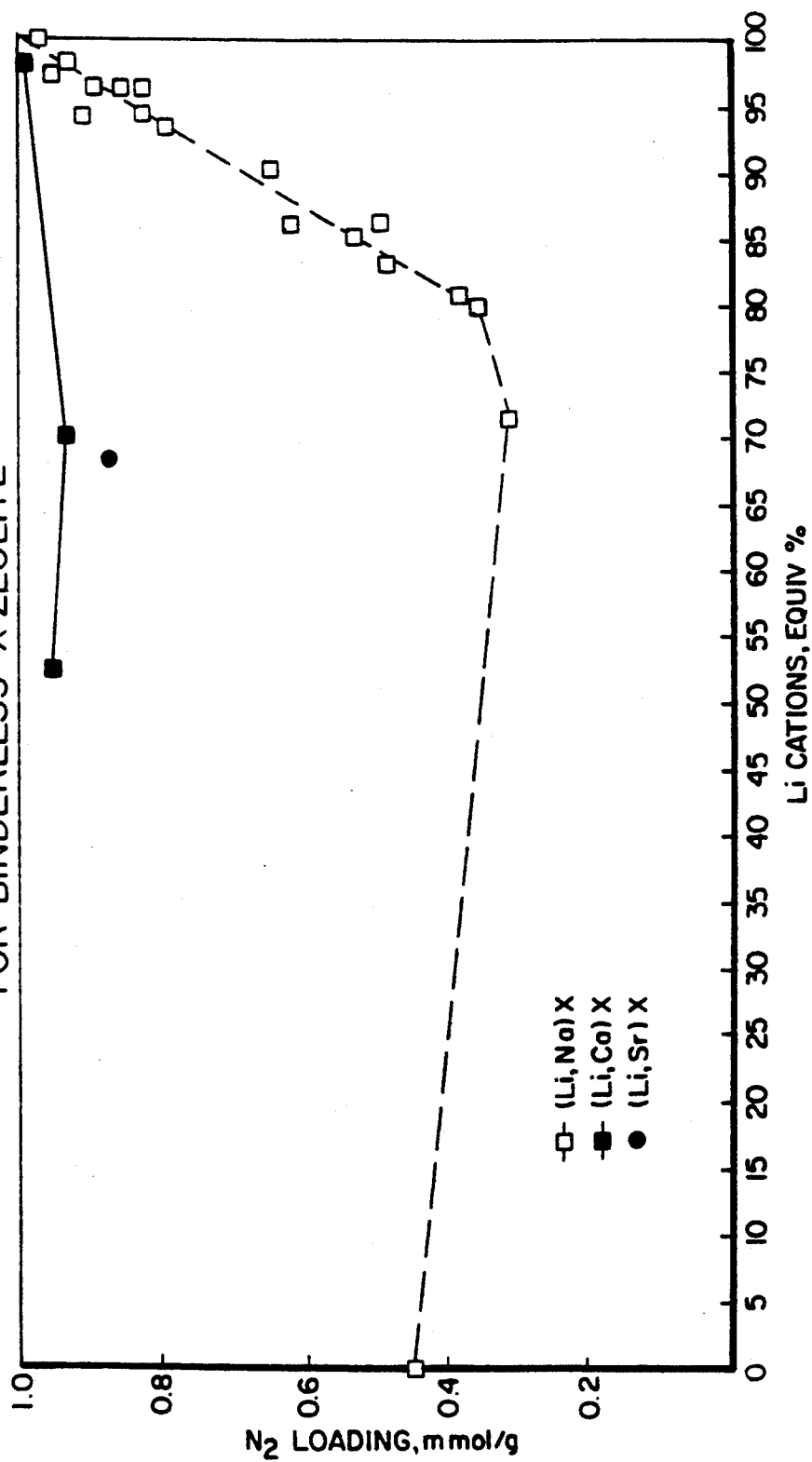

5,152,813

NITROGEN ADSORPTION WITH A CA AND/OR SR EXCHANGED LITHIUM X-ZEOLITE

TECHNICAL FIELD

The present invention is directed to gas separations using nitrogen selective adsorbents. More particularly, the present invention is directed to at least binary exchanged X-zeolites using a combination of lithium and calcium and/or strontium cations to recover oxygen or nitrogen from gas mixtures containing them, such as air.

BACKGROUND OF THE PRIOR ART

Adsorptive separations using zeolitic structures as adsorbents are well known in the prior art for resolving a multitude of gas mixtures. Such separations are predicated upon the compositions of the gas mixtures and the components' selectivity for adsorption on adsorbents, such as zeolites.

The use of nitrogen in industrial gas applications has seen significant growth particularly with the development of noncryogenic gas mixture separations. A major field of nitrogen separation comprises the separation of nitrogen from air. The removal of nitrogen from air results in an enriched oxygen gas component which is less strongly adsorbed by appropriate zeolites which are selective for nitrogen adsorption. When oxygen is desired as product typically at elevated pressure, it is desirable to adsorb nitrogen from air to result in unadsorbed oxygen enriched product passing over a nitrogen selective adsorbent. The nitrogen is then removed during a stage of desorption, typically at lower pressure. This results in oxygen being recovered at the pressure of the feed air, while nitrogen is recovered at a pressure below the feed air pressure. As a result, for the production of oxygen without significant pressure loss in an adsorptive separation of air, it is desirable to utilize nitrogen selective adsorbents such as the family of zeolites.

Although various zeolites are naturally occurring and various synthetic zeolites are known, some of which have appropriate selectivities for nitrogen over oxygen and other less strongly adsorbed substances such as hydrogen, argon, helium and neon, the industry has attempted to enhance the performance of various zeolites to improve their selectivity and capacity for nitrogen over such less strongly adsorbed substances such as oxygen. For instance, in U.S. Pat. No. 4,481,018, various sodium or calcium X-zeolites and faujasites are known which have low silicon to aluminum ratios in the order of approximately 1 to 1.2. The zeolites of this patent have utility for nitrogen adsorption, particularly from gas mixtures such as air when activated in a particular technique which minimizes the presence of water as it evolves from the material. The technique is further described in U.S. Pat. No. 4,544,378.

In U.K. Patent 1,580,928, a process for making low silica X-zeolites ("LSX"; where LSX is X-zeolite with a Si/Al=1) is set forth comprising preparing an aqueous mixture of sources of sodium, potassium, aluminate and silicate and crystallizing the mixture at below 50° C. or aging the mixture at 50° C. or below followed by crystallizing the same at a temperature in the range of 60° C. to 100° C.

Gunter H. Kuhl in an article "Crystallization of Low-Silica Faujasite" appearing in Zeolites (1987) 7, p451 disclosed a process for making low silica X-zeolites comprising dissolving sodium aluminate in water with the addition of NaOH and KOH. Sodium silicate was diluted with the remaining water and rapidly added to the NaAlO$_2$—NaOH—KOH solution. The gelled mixture was then aged in a sealed plastic jar for a specified time at a specified temperature. The product was filtered and washed.

Other low silica X-zeolite synthesis processes are available, such as those set forth in U.S. Pat. No. 4,606,899.

In U.S. Pat. No. 3,140,931, the use of crystalline zeolitic molecular sieve material having apparent pore sizes of at least 4.6 Angstroms for separating oxygen-nitrogen mixtures at subambient temperatures is disclosed.

U.S. Pat. No. 3,140,932 specifically claims Sr, Ba, or Ni ion exchanged forms of zeolite X.

U.S. Pat. No. 3,313,091 claims the use of Sr X-zeolite at adsorption temperatures near atmospheric, and subatmospheric desorption pressures.

It is also known in U.S. Pat. No. 4,557,736 to modify X-zeolites by ion exchange of available ion sites with several divalent cations to produce a binary ion exchanged X-zeolite wherein the binary ions which are exchanged comprise calcium and strontium. These binary ion exchanged X-zeolites using calcium and strontium are reported to have higher nitrogen adsorption capacity, low heat of nitrogen adsorption and good nitrogen selectivity for air separation.

It is also known to exchange X-zeolites with lithium to provide an improved nitrogen selective adsorbent as set forth in U.S. Pat. No. 4,859,217. This patent suggests an improved nitrogen adsorbent can be achieved when an X-zeolite is exchanged with lithium cations at greater than 88%. The starting material for this patented zeolite is sodium X-zeolite. Therefore, the patent recites a lithium-sodium X-zeolite for nitrogen adsorption.

The prior art lithium X-zeolite was reported in U.S. Pat. No. 3,140,933 as useful for nitrogen-oxygen separations.

In an article entitled, "Investigations of the Arrangement and Mobility of Li ions in X- and Y-zeolites and the Influence of Mono- and Divalent Cations on It" by H. Herden, W. D. Einicke, R. Schollner and A. Dyer, appearing in J. Inorganic Nuclear Chemistry, Vol. 43, No. 10, pages 2533 thru 2536 (1981), the existence of mixed cation, lithium and calcium exchanged X-zeolites are set forth. Physical parameters of the exchange zeolites are discussed with a general recitation to adsorptive and catalytic utilities of zeolites in general.

Although improved exchanged X-zeolite adsorbents have been reported in the art for nitrogen adsorptions, and particularly the high performance of highly lithium exchange X-zeolites are known, such zeolites are difficult to achieve at high level lithium exchange and constitute an expensive adsorbent to produce for nitrogen separations. Such production difficulties and expense limit the use of such exchanged X-zeolites to produce either nitrogen or oxygen in competition with other separation technologies, such as cryogenic distillation and membrane separations. Therefore, a problem exists in the art for providing an appropriately exchanged X-zeolite for effective nitrogen adsorptive separation using an exchanged X-zeolite which is readily produced and has a favorable cost so as to result in competitively priced nitrogen, oxygen or other gas component product pricing. The art also desires to have a high selectivity exchanged X-zeolite with reasonable working capacities which do not inhibit continuous operation or adsorbent regeneration. These unresolved problems are achieved by the present invention, which is set forth below.

BRIEF SUMMARY OF THE INVENTION

The present invention is a process for selectively adsorbing nitrogen from a gas mixture containing nitrogen and at least one less strongly adsorbed component which comprises contacting the gas mixture with an adsorbent which is selective for the adsorption of nitrogen, comprising a crystalline X-zeolite having a zeolitic Si/Al ratio less than or equal to 1.5 and an at least binary ion exchange of exchangeable ion content with between 5% and 95% lithium and with between 5% and 95% of a second ion selected from the group consisting of calcium, strontium and mixtures thereof, wherein the sum of the lithium and second ion in ion exchange is at least 60% of the exchangeable ion content.

Preferably, the zeolite is ion exchanged with lithium to approximately 50% to 95%.

Preferably, the zeolite is ion exchanged with the second ion to approximately 5% to 50%.

Preferably, the zeolite is ion exchanged with approximately 15% of the second ion and 85% lithium.

Preferably, the second ion is calcium. Alternatively, the second ion is strontium.

Preferably, the zeolite is ion exchanged with approximately 15% calcium and 85% lithium.

Preferably, the gas mixture contains nitrogen and oxygen. More preferably, the gas mixture is air.

Preferably, the Si/Al ratio is approximately 1.

Preferably, an oxygen and nitrogen containing gas mixture contacts a zone of such adsorbent, the nitrogen is selectively adsorbed and the oxygen passes through the zone and is recovered as an oxygen enriched product.

Preferably, the oxygen product has a purity of at least approximately 90% oxygen.

Preferably, the adsorption is conducted at an average bed temperature in the range of approximately 55° to 135° F.

Preferably, the zone is operated through a series of steps comprising: adsorption, during which the gas mixture contacts the adsorbent, nitrogen is selectively adsorbed and oxygen passes through zone as product; depressurization during which the gas mixture contact is discontinued and the zone is reduced in pressure to desorb the nitrogen; and repressurization with oxygen product to the adsorption pressure.

Preferably, the adsorption pressure is in the range of approximately 35 to 65 psia.

Preferably, the depressurization is conducted down to a level in the range of approximately 14.7 to 16.7 psia.

Alternatively, the zone is operated through a series of steps comprising: adsorption, during which the gas mixture contacts the adsorbent, nitrogen is selectively adsorbed and oxygen passes through zone as product; depressurization during which the gas mixture contact is discontinued and the zone is reduced in pressure to desorb the nitrogen; evacuation to further desorb the nitrogen to below ambient pressure; and repressurization with oxygen product to the adsorption pressure.

Preferably, the adsorption pressure is in the range of approximately 900 to 1600 torr.

Preferably, the evacuation is conducted down to a level in the range of approximately 80 to 400 torr.

BRIEF DESCRIPTION OF THE DRAWINGS

FIG. 9 is a graph of the effect of lithium exchange levels on nitrogen loading at 700 torr and 23° C. for binderless X-zeolite with a silicon to aluminum ratio of 1.2 showing that the X-zeolites are similar to the low silicon X-zeolites (LSX) and also display the unique and unexpected performance of the present invention.

DETAILED DESCRIPTION OF THE INVENTION

Figure 1:
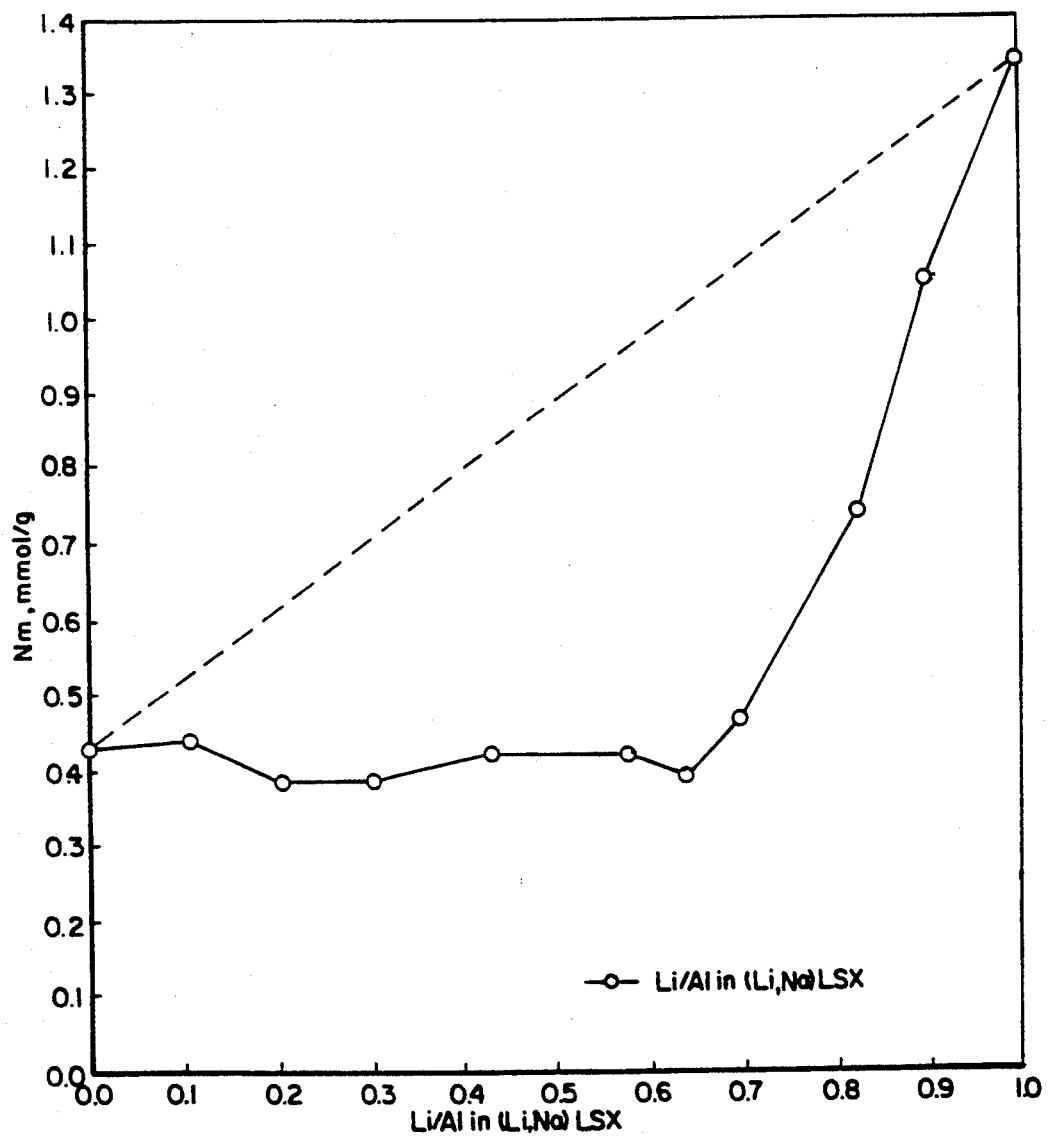
FIG. 1 is a graph of nitrogen capacity for the extent of lithium exchange in a lithium, sodium LSX-zeolite at 1 atmosphere and 23° C. showing that capacity uniformly is less than what might be expected from straight line extrapolation of 100% sodium to 100% lithium ion content.

The process of the present invention directed to nitrogen adsorption from gas mixtures of less strongly adsorbed components, such as: oxygen, hydrogen, argon and helium is achieved by the use of a binary, ternary or further exchanged X-zeolite wherein, typically, a sodium or sodium, potassium X-zeolite is exchanged with lithium and calcium and/or strontium either co-currently or sequentially to result in a lithium, calcium and/or strontium X-zeolite, which may contain a residual minor amount of sodium or potassium ions. The lithium content is in the range of approximately 5% to 95% lithium, preferably 50% to 95%, more preferably, 85%. The appropriate respective calcium and/or strontium content is between 5% and 95% calcium and/or strontium, preferably 5% to 50%, more preferably 15% calcium, but obviously the combination of lithium and calcium and/or strontium chosen for any set of percentages would not exceed 100% and in some instances may be less than 100% based upon residual sodium or potassium cation content. Preferably, the X-zeolite is a low silica X-zeolite with a Si/Al ratio of approximately 1 and with approximately 15% calcium and 85% lithium, although any combination of exchange wherein the lithium and calcium and/or strontium is at least 60% of the exchangeable ion content in the zeolite is acceptable.

Although other ion forms of X-zeolites can be used, typically a sodium or mixed sodium/potassium X-zeolite is used to prepare the at least binary ion exchanged materials. Typically, the ions are exchanged co-currently, although they can be exchanged sequentially, for example by exchanging a sodium X-zeolite with calcium to produce a calcium X-zeolite, which can then be partially ion exchanged with lithium to yield the desired adsorbent. The ion exchange is accomplished by contacting the sodium or mixed sodium and potassium X-zeolite with a salt of the ion to be exchanged. Other methods of ion exchange are contemplated and can be used for the present invention.

These binary ion exchanged X-zeolite adsorbents have higher nitrogen working capacity than pure calcium exchanged X-zeolites and comparable nitrogen working capacity to lithium exchanged X-zeolites, yet have heats of adsorption for nitrogen which allow for commercial utility. Additionally, the at least binary ion exchanged X-zeolites of the present invention exhibit higher nitrogen/oxygen selectivity than that observed for the prior art lithium, sodium X-zeolite at the same lithium exchange level and higher than that observed for the prior art calcium, sodium X-zeolite at the same calcium exchange level.

An added benefit of the lithium, calcium X-zeolites of the present invention is that they do not display the deterioration in performance with increasing temperature observed for the prior art lithium, sodium X-zeolites in vacuum swing adsorption processes.

The use of calcium to make lithium, calcium X-zeolites results in a lower cost adsorbent than the highly exchanged levels of lithium X-zeolite because calcium salts cost less than lithium salts, and the exchange of calcium for sodium is much more thermodynamically favorable than the exchange of lithium for sodium. The ability to alter the respective amounts of calcium and/or strontium and lithium exchange provides far more flexibility in optimizing the adsorbent properties for various gas separation operations. A preferred use for the at least binary ion exchanged X-zeolites of the present invention is the separation of nitrogen from oxygen in air using a pressure swing adsorption ("PSA") or vacuum swing adsorption ("VSA") process. In such a process, an adsorbent bed comprising binary ion exchanged lithium, calcium X-zeolite, as described above, is initially pressurized with oxygen. A gas stream comprising nitrogen and oxygen, such as air at a temperature between 0° and 50° C. and a pressure between 1 atmosphere and 5 atmospheres, is passed over the adsorbent bed. A portion of the nitrogen in the gas stream is adsorbed by said ion exchanged zeolites, thereby producing an oxygen-enriched product stream. The nitrogen containing adsorbent bed is subsequently depressurized and evacuated with the option of being purged with oxygen enriched gas to produce a nitrogen enriched stream. The bed is then repressurized with product oxygen and adsorption can be reinitiated. Alternatively, these materials can be used for recovering a nitrogen enriched product using, for example, an existing nitrogen vacuum swing adsorption process as described in U.S. Pat. No. 4,013,429, wherein the process includes the steps of feed, rinse, desorption, and repressurization.

Although the at least binary exchange levels of lithium and calcium and/or strontium on the X-zeolite demonstrate high performance for nitrogen selective adsorptive separation, additional benefit can be achieved by the appropriate selection or treatment of the aluminum content of the zeolitic framework to produce preferred results. X-zeolites typically have a silicon to aluminum ratio less than or equal to 1.5 and typically between 1.2 and 1.5. For the purposes of the present invention using binary exchanged X-zeolites however, it is preferred to use a low silica X-zeolite having a silicon to aluminum ratio of approximately 1.

The adsorbent must be dehydrated before being used for gas separation using a thermal activation step. Such a thermal activation step can be achieved by a number of different methods in which the zeolitic water and the hydration spheres are carefully removed and the amount of water in the gaseous environment in contact with the zeolite during this step is minimized. That is, the partial pressure of water making such contact should be less than about 0.4 atmospheres, preferably not more than about 0.1 atmospheres.

One method of accomplishing this is to subject the at least binary exchanged X-zeolite composition, which contains up to about 30% by weight of water, to pressures in the range of about 0.1 to 10 atmospheres while maintaining sufficient molar mass velocities and residence times of a flow of a non-reactive purge gas, that is a molar mass velocity of about 0.5 to 100 kilograms mole per meter squared hour and a residence time of no greater than about 2.5 minutes, and then heat the composition at a temperature ramp of 0.1° to 40° C. per minute up to a temperature of at least about 300° C. and no greater than about 650° C. The residence time is defined as the volume of the column or other unit used to thermally activate the zeolite divided by the volumetric flow rate of the purge gas at the standard temperature and pressure. The molar mass velocity is the flow rate of the purged gas divided by the cross-sectional area of the column used for thermal activation. The purpose of the purge gas is to provide a sufficient mass for efficient heat and mass transfer from the surface of the adsorbent at a residence time to limit the water in the purge gas exiting the adsorbent bed to the desired low limits. The minimum residence time is determined by economic and process constraints, although times of less than 0.0025 minutes would appear to provide no advantages.

Another method of thermal activation is to conduct the activation under less than about 0.1 atmospheres vacuum without the use of the purge gas and to heat the material to the desired activation temperature and a ramp temperature of from 0.1° to 40° C. per minute.

Still another method that is available for thermal activation of zeolitic adsorbents is the use of microwave radiation, conditions that are described in U.S. Pat. No. 4,322,394, of which the description of the microwave procedure for thermally activating zeolites is incorporated herein by reference.

We have found unexpectedly that the nitrogen capacities of the at least binary lithium, calcium and/or strontium ion exchanged forms of X-zeolite unexpectedly exceed what might be expected from a straight line extrapolation of the capacities of the two end member ions. In contrast, the nitrogen capacities of the prior art binary calcium, sodium ion exchange forms of X-zeolite and the binary lithium, sodium ion exchanged forms of X-zeolite are always less than what might be expected from a straight line extrapolation of the nitrogen capacities of the two end members. The unexpected performance of mixtures of lithium and calcium is also observed for ternary systems containing, for example, residual sodium or potassium, as long as the sum of the lithium and calcium and/or strontium exchange levels is greater than about 60%.

In the ion exchange experiments set forth below which demonstrate the present invention, various zeolite starting materials were used. Sodium X-zeolite powder with a Si/Al ratio of 1.2 was obtained from the Linde Division of Union Carbide Corporation.

Sodium, potassium LSX-zeolite powder was prepared by the method of Kuhl and Sherry in UK 1,580,928. In that patent, a process for making low silica zeolites is set forth comprising preparing an aqueous mixture of sources of sodium, potassium, aluminate and silicate and crystallizing the mixture at below 50° C. or aging the mixture at 50° C. or below followed by crystallizing the same at a temperature in the range of 60° C. to 100° C. (See also Kuhl, G. H. *Zeolites* 1987, 7, 451). Other samples of sodium, potassium LSX-zeolite powder were prepared from clay by the process of Butter et al. in U.S. Pat. No. 4,606,899 in which kaolin clay, calcined to at least 700° C., is converted to LSX-zeolite by agitating a reaction mixture, comprised of the clay with sodium and potassium hydroxide, at temperatures in excess of 50° C. and seeding the resulting mixture with LSX-zeolite at a predetermined time after the reaction has been initiated.

EXAMPLE 1

Lithium, Sodium LSX-zeolite Control

Lithium LSX-zeolite was prepared by ion exchange of sodium, potassium LSX-zeolite powder using five static exchanges at 100° C. with a 6.3-fold equivalent excess of 2.2M LiCl. Various exchange levels of lithium, sodium LSX-zeolite were prepared by adding nine separate samples of the initially prepared lithium LSX-zeolite powder to various amounts of 0.1M NaCl and stirring at room temperature for about 4 h. The mixed cation samples were filtered but not washed to prevent hydrolysis of the lithium cations. The use of a dilute solution made the errors in cation levels introduced by the solution retained on the filter cake insignificant.

The samples were analyzed by Inductively Coupled Plasma-Atomic Emission Spectroscopy (ICP-AES) for silicon and aluminum and Atomic Absorption Spectroscopy (AA) for lithium, sodium, and potassium. Table I contains the results of elemental analyses for the amount of lithium and sodium in the exchanged samples.

Adsorptive capacities for nitrogen ($N_2$) were obtained using a conventional McBain gravimetric adsorption unit that could contain nine samples. Samples were first superficially dried at 110° C. in an oven purged with $N_2$ at a high flow rate. Approximately 5 g were loaded into the McBain sample buckets, and the samples were heated under vacuum at 1° C./min or less to 550° C. The samples were held at 550° C. until the pressure dropped to about 10 microns of Hg. After activation, $N_2$ isotherms were obtained to 1 atm at 23° C. The isotherm data was fit to the standard Langmuir isotherm equation:

$$N_m = mbP/(1+bP)$$

where $N_m$ is the amount adsorbed, P is the pressure, m is the monolayer capacity and b is the affinity parameter. The fits were used to generate $N_2$ capacities and isothermal $N_2$ working capacities reported in Table I.

FIG. 1 compares the observed $N_2$ capacities for the extent of lithium exchange level in lithium, sodium LSX-zeolite to what might be expected from straight line extrapolation of 100% sodium to 100% lithium ion content. It shows that for lithium, sodium LSX-zeolite, $N_2$ capacity uniformly is less than what might be expected.

The effect of lithium exchange level on $N_2$ capacity for lithium, sodium binary exchanged forms of LSX-zeolite is very similar to that reported for X-zeolite by Chao in U.S. Pat. No. 4,859,217.

TABLE I

| Nitrogen Capacities for Mixed Cation (Li,Na)LSX after Activation to 550° C., 2 × 10⁻² torr | | | |
|---|---|---|---|
| sample number | Li/Al eq ratio | Na/Al eq ratio | $N_m$(obs)[1], mmol/g | $N_m$(delta),[2] mmol/g |
| 1 | 1.03 | 0.01 | 1.35 | 0.90 |
| 2 | 0.90 | 0.10 | 1.06 | 0.70 |
| 3 | 0.83 | 0.20 | 0.74 | 0.51 |
| 4 | 0.70 | 0.27 | 0.47 | 0.32 |
| 5 | 0.64 | 0.34 | 0.40 | 0.28 |
| 6 | 0.58 | 0.45 | 0.42 | 0.29 |
| 7 | 0.43 | 0.55 | 0.42 | 0.29 |
| 8 | 0.30 | 0.66 | 0.39 | 0.26 |
| 9 | 0.21 | 0.75 | 0.39 | 0.26 |
| 10 | 0.11 | 0.86 | 0.44 | 0.31 |
| 11 | n/a | 1.00 | 0.43 | 0.30 |

[1] $N_m$(obs) = nitrogen capacity at 1 atm. and 23° C.
[2] $N_m$(delta) = isothermal working capacity from 0.2 to 1.0 atm at 23° C.
n/a = not analyzed

EXAMPLE 2

Calcium, Sodium LSX-Zeolite Control

Sodium LSX-zeolite was prepared by ion exchange of sodium, potassium LSX-zeolite using three static exchanges at 100° C. with a 4.2-fold equivalent excess of 1.1M NaCl. Various exchange levels of calcium, sodium LSX-zeolite were prepared by adding nine separate samples of the initially prepared sodium LSX-zeolite powder to varying amounts of 0.05M $CaCl_2$ and stirring at room temperature for about 4 h. The mixed cation samples were filtered but not washed. Table II contains the results of elemental analyses for the amount of calcium and sodium in the exchanged samples. $N_2$ capacities and isothermal working capacities were obtained at 23° C. using the McBain gravimetric adsorption unit as described in Example 1.

Figure 2:
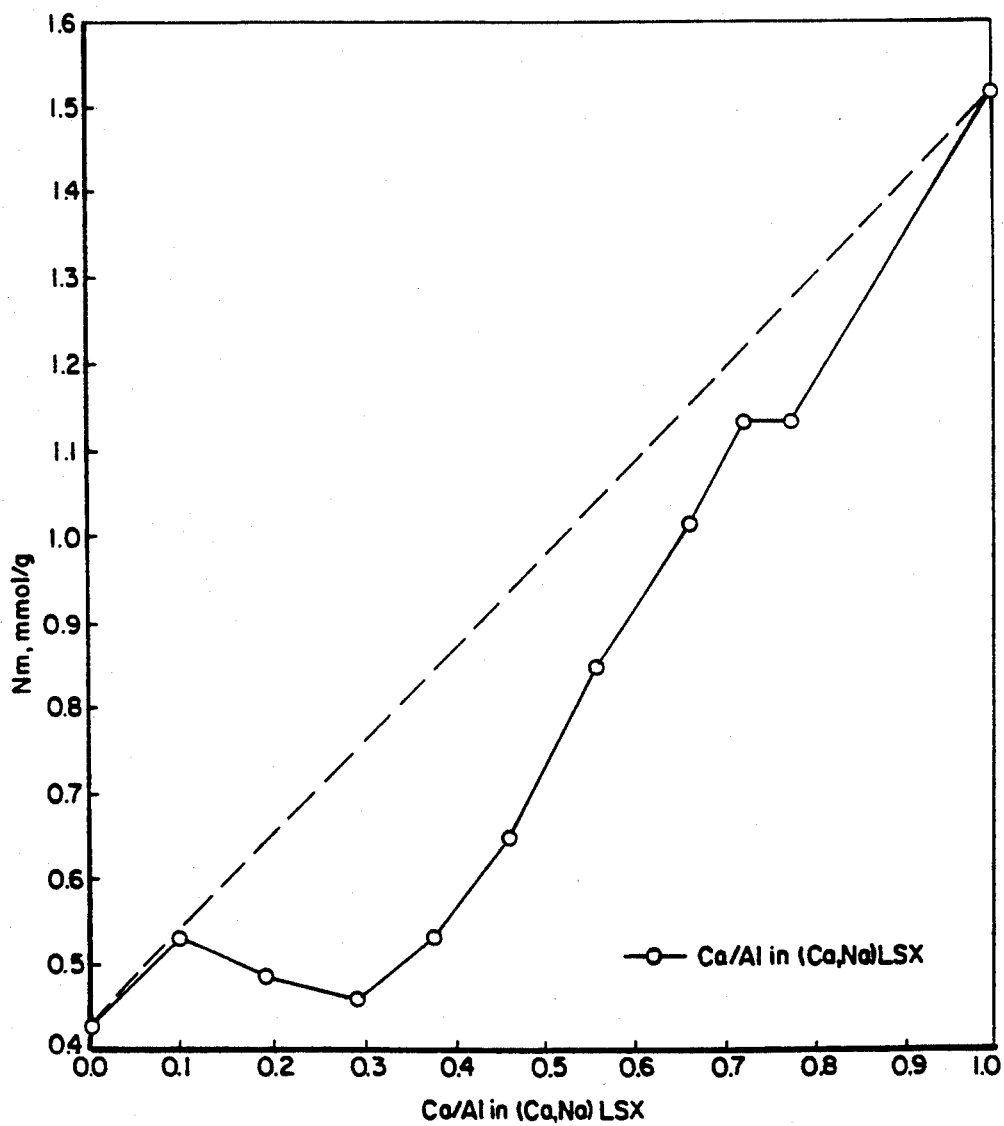
FIG. 2 is a graph of nitrogen capacity for the extent of calcium exchange in a calcium, sodium LSX-zeolite at 1 atmosphere and 23° C. showing that capacity uniformly is less than what might be expected from straight line extrapolation of 100% sodium to 100% calcium ion content.

FIG. 2 compares the observed $N_2$ capacities for the extent of calcium exchange level in calcium, sodium LSX-zeolite to what might be expected from straight line extrapolation of 100% sodium to 100% calcium ion content. It shows that for calcium, sodium LSX-zeolite, $N_2$ capacity uniformly is less than what might be expected.

The effect of calcium exchange level on $N_2$ capacity for calcium, sodium binary exchanged forms of LSX-zeolite is very similar to that reported for the effect of calcium exchange level on $N_2/O_2$ selectivity for X-zeolite by Coe et al. in U.S. Pat. No. 4,481,018.

TABLE II

Nitrogen Capacities for Mixed Cation (Ca, Na)LSX after Activation to 550° C., 1 × 10$^{-2}$ torr

| sample number | Na/Al eq ratio | Ca/Al eq ratio | $N_m$(obs)[2], mmol/g | $N_m$(delta),[3] mmol/g |
|---|---|---|---|---|
| 1 | 1.00 | n/a | 0.43 | 0.31 |
| 2 | 0.86 | 0.10 | 0.53 | 0.36 |
| 3 | 0.77 | 0.19 | 0.49 | 0.33 |
| 4 | 0.70 | 0.29 | 0.46 | 0.35 |
| 5 | 0.58 | 0.38 | 0.53 | 0.38 |
| 6 | 0.50 | 0.46 | 0.65 | 0.46 |
| 7 | 0.36 | 0.56 | 0.85 | 0.56 |
| 8 | 0.30 | 0.66 | 1.02 | 0.63 |
| 9 | 0.25 | 0.72 | 1.14 | 0.67 |
| 10 | 0.20 | 0.77 | 1.14 | 0.65 |
| 11[1] | n/a | 0.97 | 1.53 | 0.74 |

[1]Vacuum activation to 400° C., <1 × 10$^{-5}$ torr
[2]$N_m$(obs) = nitrogen capacity at 1 atm. and 23° C.
[3]$N_m$(delta) = isothermal working capacity from 0.2 to 1.0 atm at 23° C.
n/a = not analyzed

EXAMPLE 3

Lithium, Calcium LSX-Zeolite $N_2$ Capacities

Various exchange levels of lithium, calcium LSX-zeolite were prepared by adding six separate samples of lithium LSX-zeolite powder to varying amounts of 0.05M $CaCl_2$ and stirring at room temperature for about 4 h. The mixed cation samples were filtered but not washed. Table III contains the results of elemental analyses for the amount of lithium and calcium in the exchanged samples and $N_2$ capacities and isothermal working capacities at 23° C. obtained using the McBain gravimetric adsorption unit as described in Example 1. Binary lithium, calcium LSX-zeolite samples with high levels of calcium lost crystallinity as a result of drying and activation; consequently, results from the high pressure volumetric unit (described below and summarized in Table VI) obtained on the samples with high calcium exchange levels were used for comparison to the controls.

Figure 3:
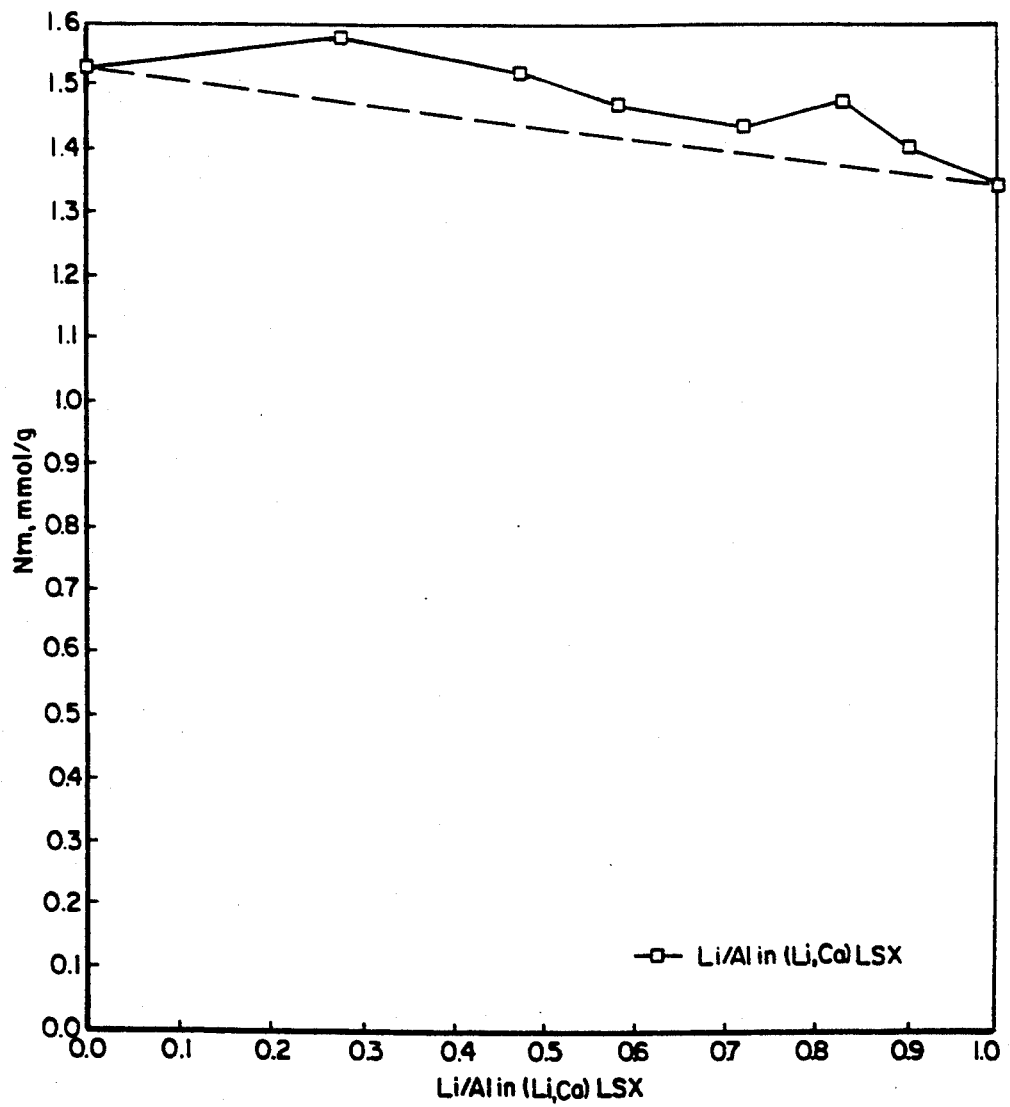
FIG. 3 is a graph of nitrogen capacity for the extent of lithium exchange in a lithium, calcium LSX-zeolite at 1 atmosphere and 23° C. showing that capacity uniformly and unexpectedly is in excess of what might be expected from straight line extrapolation of 100% calcium to 100% lithium ion content.

FIG. 3 compares the observed $N_2$ capacities for the extent of lithium exchange level in lithium, calcium LSX-zeolite to what might be expected from straight line extrapolation of 100% calcium to 100% lithium ion content. In contrast to the prior art binary lithium, sodium and calcium, sodium exchanged zeolites, as demonstrated in Example 1 and Example 2, the observed $N_2$ capacities for binary ion exchanged lithium, calcium LSX-zeolite are uniformly and unexpectedly in excess of what might be expected. Comparison of FIGS. 1, 2 and 3 demonstrates the improved performance of lithium, calcium binary ion exchanged forms of LSX-zeolite over other binary ion exchanged forms of LSX-zeolite containing calcium or lithium known in the prior art.

TABLE III

Nitrogen Capacities for Mixed Cation (Li, Ca)LSX after Activation to 550° C., 1 × 10$^{-2}$ torr

| sample number | Li/Al eq ratio | Ca/Al eq ratio | $N_m$(obs)[2], mmol/g | $N_m$(delta),[3] mmol/g |
|---|---|---|---|---|
| 1 | 1.03 | n/a | 1.35 | 0.90 |
| 2 | 0.90 | 0.10 | 1.42 | 0.89 |
| 3 | 0.83 | 0.20 | 1.49 | 0.93 |
| 4 | 0.73 | 0.30 | 1.45 | 0.89 |
| 5 | 0.59 | 0.41 | 1.48 | 0.87 |
| 6[1] | 0.48 | 0.51 | 1.53 | 0.90 |
| 7[1] | 0.28 | 0.72 | 1.59 | 0.85 |
| 8[1] | n/a | 0.97 | 1.53 | 0.74 |

[1]Vacuum activation to 400° C., <1 × 10$^{-5}$ torr
[2]$N_m$(obs) = nitrogen capacity at 1 atm. and 23° C.
[3]$N_m$(delta) = isothermal working capacity from 0.2 to 1.0 atm at 23° C.
n/a = not analyzed $N_2$ capacities at 23° C. and 1 atm. of about 1.5 mmol/g for lithium, calcium LSX-zeolites with compositions around 70% lithium/30% calcium (FIG. 3) are particularly unexpected. The prior art lithium, sodium LSX-zeolites would suggest that any LSX-zeolite containing 70% lithium should have a capacity of only 0.4 mmol/g (see 70% lithium in FIG. 1). Likewise, the prior art calcium, sodium LSX-zeolites would suggest that an LSX-zeolite containing 30% calcium should have a capacity of only about 0.45 mmol/g (see 30% calcium in FIG. 2).

Figure 5:
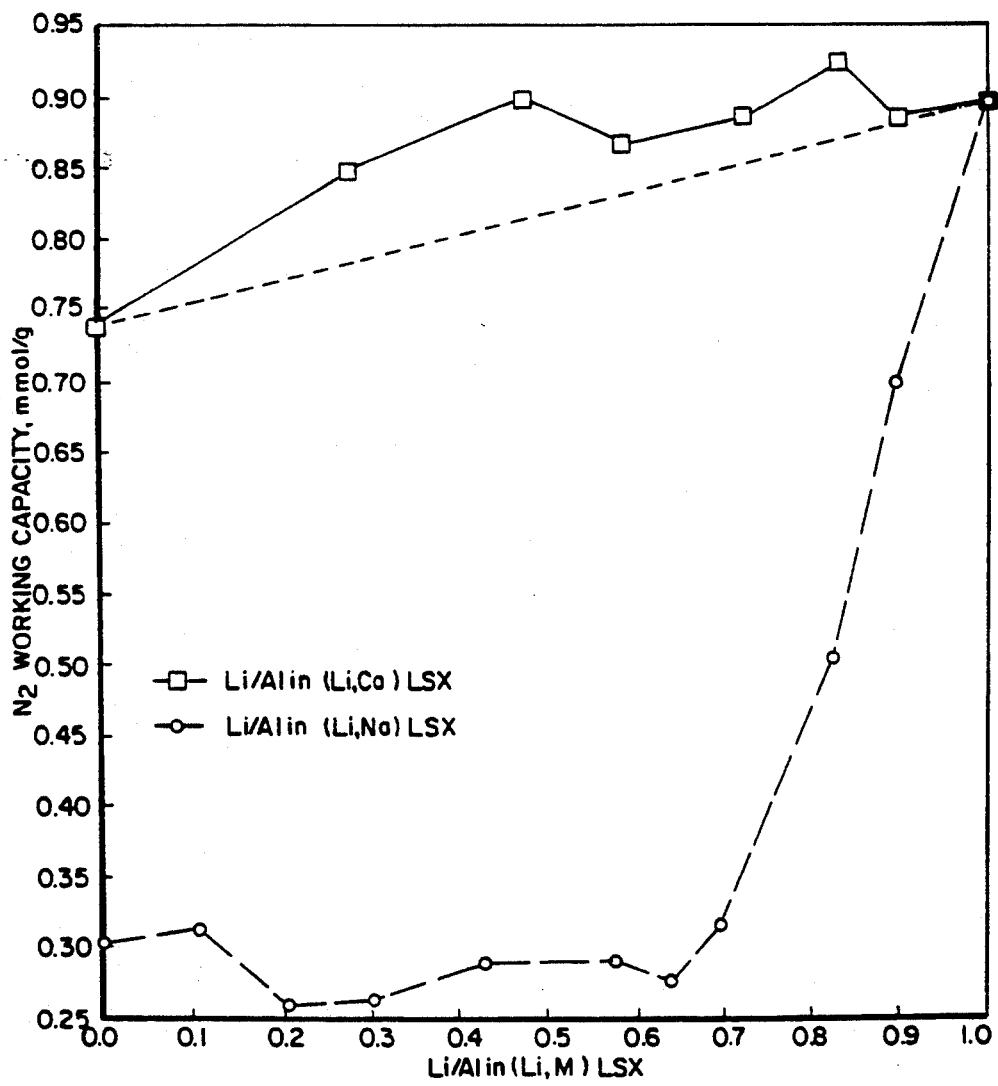
FIG. 5 is a graph of isothermal nitrogen working capacity for the extent of lithium exchange in a lithium, calcium LSX-zeolite and lithium, sodium LSX-zeolite from 0.2 to 1.0 atmosphere and 23° C. showing that working capacity for lithium, calcium LSX-zeolite uniformly and unexpectedly is in excess of what might be expected from straight line extrapolation of 100% calcium to 100% lithium ion content, in contrast to lithium, sodium LSX-zeolite, which is well below its expected working capacity.
Figure 6:
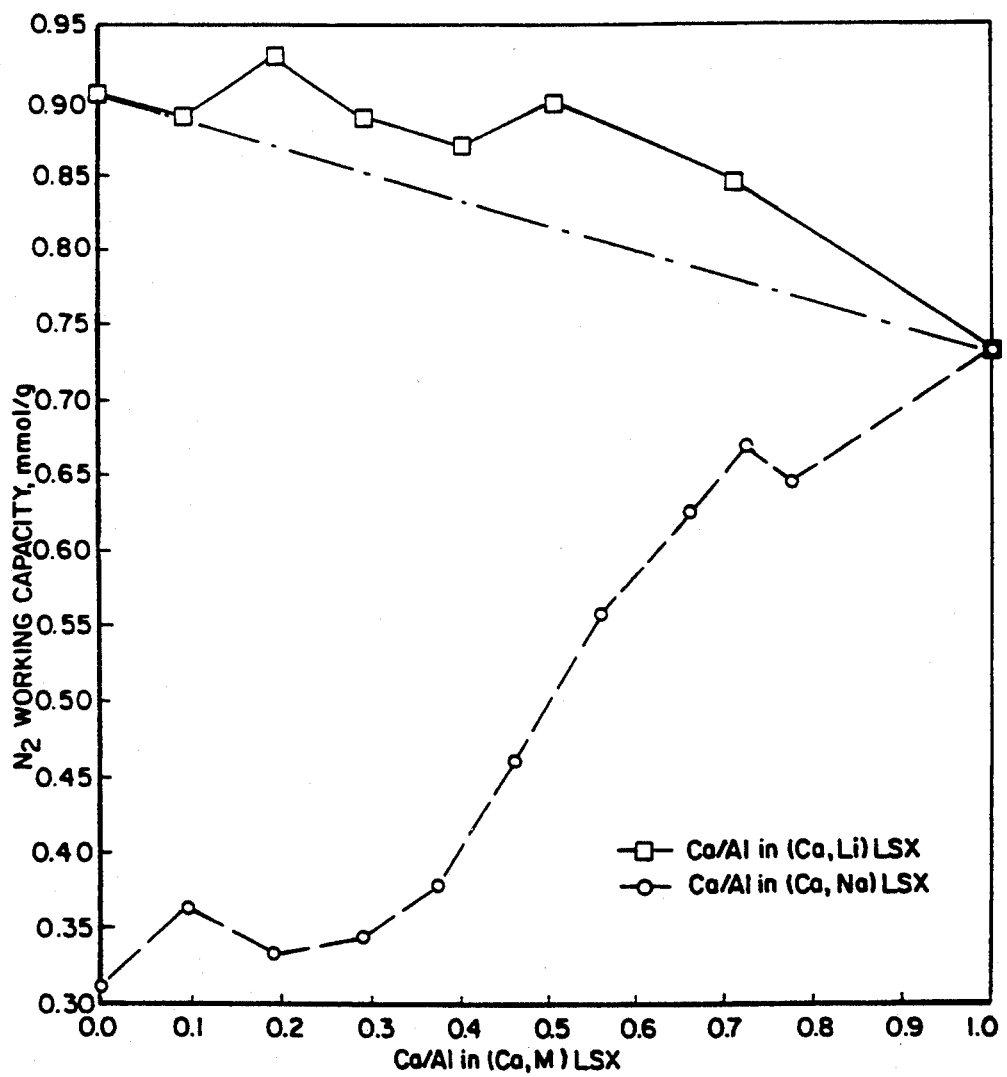
FIG. 6 is a graph of isothermal nitrogen working capacity for the extent of calcium exchange in a lithium, calcium LSX-zeolite and calcium, sodium LSX-zeolite from 0.2 to 1.0 atmosphere and 23° C. showing that working capacity for lithium, calcium LSX-zeolite uniformly is in excess of what might be expected from straight line extrapolation of 100% calcium to 100% lithium ion content, in contrast to calcium, sodium LSX-zeolite, which is below or even to its expected working capacity.

The $N_2$ capacity alone is not a measure of an adsorbent's ability to effect a separation of $N_2$ from other components. Berlin, in U.S. Pat. No. 3,313,091, points out the importance of the shape and slope of the component isotherms in the pressure region of interest. Consequently, the isothermal $N_2$ working capacities from 0.2 to 1.0 atm, a pressure region of interest for $O_2$ VSA air separation processes, were also compared for binary lithium, calcium LSX-zeolite from Example 3 and the comparable lithium, sodium LSX-zeolite and calcium, sodium LSX-zeolite controls in Examples 1 and 2. The isothermal $N_2$ working capacity for lithium, calcium LSX-zeolite at any lithium exchange level is always higher than the working capacity for the prior art lithium, sodium LSX-zeolite at the same lithium exchange level (Table III $N_m$ delta contrasted with Table I $N_m$ delta) as depicted in FIG. 5. Likewise, the working capacity for lithium, calcium LSX-zeolite at any calcium exchange level (Table III) is always higher than the working capacity for the prior art calcium, sodium LSX-zeolite at the same calcium exchange level (Table II) as depicted in FIG. 6.

In addition, it can be observed that the nitrogen working capacities remain relatively constant for lithium exchange levels greater than about 50%. This suggests that the preferred composition range for lithium, calcium LSX zeolite for $O_2$ VSA is from 50-95% lithium and 5-50% calcium.

EXAMPLE 4

Lithium, Calcium, Sodium LSX-Zeolite $N_2$ Capacities

The prior examples illustrated the improved performance of binary ion exchanged lithium, calcium LSX-zeolite over other binary ion exchanged forms of LSX-zeolite containing lithium or calcium. This example demonstrates the beneficial effect of lithium in combination with calcium for ternary ion exchanged forms that contain other cations, such as sodium, in addition to lithium and calcium.

Various exchange levels of lithium, calcium, sodium LSX-zeolite containing about 85% lithium were prepared by adding a number of separate samples of lithium LSX-zeolite powder to varying amounts of 0.1N solution containing various amounts of $CaCl_2$ and NaCl and stirring at room temperature for about 4 h. The samples were filtered but not washed. Table IV-A contains the results of elemental analyses for the amounts of lithium, calcium and sodium in the exchanged samples.

Adsorption measurements were made at high pressure using an automated volumetric adsorption unit. Approximately 2–2.5 g of sample was loaded into a stainless steel sample cylinder protected with a 20-micron filter to prevent loss of sample. The samples were heated under vacuum at 1° C./min or less to 400° C. and held at 400° C. until the pressure dropped below $1 \times 10^{-5}$ torr (vacuum activation). After activation, $N_2$ isotherms were obtained to 12000 torr at 23° C. The isotherms were fit to an expression that imparts empirical heterogeneity to the Langmuir equation:

$$N_m = P/(a+(bP)+c/(1+(dP)+(dP)^2/2+(dP)^3/6))$$

where $N_m$ is the amount adsorbed, P is the pressure and a, b, c and d are coefficients. The fits were used to generate $N_2$ capacities and isothermal $N_2$ working capacities reported in Table IV-A.

TABLE IV-A

Nitrogen Capacity for Mixed Cation (Li, Ca, Na)LSX containing about 85% Li, after Activation to 400° C., <1 × $10^{-5}$ torr

| sample number | Li/Al eq ratio | Ca/Al eq ratio | Na/Al eq ratio | $N_m$(obs)[1], mmol/g | $N_m$(delta)[2], mmol/g |
|---|---|---|---|---|---|
| 1 | 0.83 | 0.16 | 0.00 | 1.47 | 1.10 |
| 2 | 0.81 | 0.10 | 0.05 | 1.28 | 1.00 |
| 3 | 0.82 | 0.05 | 0.10 | 1.07 | 0.87 |
| 4 | 0.80 | 0.00 | 0.14 | 0.91 | 0.77 |

[1]$N_m$(obs) = nitrogen capacity at 1 atm. and 23° C.
[2]$N_m$(delta) = isothermal working capacity from 0.2 to 1.2 atm at 23° C.

The effect of lithium in combination with calcium in the presence of other cations, such as sodium, was evaluated by comparing the nitrogen capacities of two series of LSX-zeolite samples containing increasing levels of calcium. The first set, control samples from Example 2, contained only calcium and sodium, with increasing calcium exchange levels of 0, 10, 20, and 30% calcium. The second set of samples, from Table IV-A, contained approximately 85% lithium, with calcium exchange levels of 0, 5, 10, and 15%, and the balance was sodium. The increasing levels of calcium were prepared by displacing sodium rather than lithium so that all the samples in the second set contained the same amount of lithium. The nitrogen capacities at 1 atm, 23° C. of these materials are listed in Table IV-B. Column two contains the nitrogen capacities for the samples containing 85% lithium, and column three contains the nitrogen capacities for the control samples containing no lithium. Column four contains the differences in nitrogen capacity between each 85% lithium, calcium, sodium LSX-zeolite sample and the nitrogen capacity of 85% lithium, sodium LSX zeolite, and column five contains the differences in nitrogen capacity between each calcium, sodium LSX-zeolite control sample and the nitrogen capacity of pure sodium LSX-zeolite. It can be observed that calcium displacing sodium in sodium LSX-zeolite has no effect on nitrogen capacity up to an exchange level of at least 30% calcium. The observed increases in nitrogen capacity for the three samples reported in column five, Table IV-B average 0.05 mmol/g greater than sodium LSX-zeolite. Thus, these control samples have the same capacity as sodium LSX-zeolite within experimental error. Unexpectedly, calcium displacing sodium in 85% lithium, sodium LSX-zeolite significantly increases the nitrogen capacity, by up to 0.56 mmol/g for 15% calcium, the maximum calcium that can displace sodium from 85% lithium, sodium LSX-zeolite. Even small amounts of calcium have an effect: 5% calcium increases the nitrogen capacity by 0.16 mmol/g.

TABLE IV-B

Effect of Ca displacing Na on $N_2$ Capacity at 1 atm, 23° C.

| | Nm, mmol/g | | Nm difference,[1] mmol/g | |
|---|---|---|---|---|
| Ca % | (85Li, Ca, Na) LSX | (Ca, Na)LSX Control | (85Li, Ca, Na) LSX | (Ca, Na)LSX Control |
| 0 | 0.91 | 0.43 | 0.00 | 0.00 |
| 5 | 1.07 | — | 0.16 | — |
| 10 | 1.28 | 0.53 | 0.37 | 0.10 |
| 15 | 1.47 | — | 0.56 | — |
| 20 | — | 0.49 | — | 0.06 |
| 30 | — | 0.46 | — | 0.03 |

[1]$N_m$ difference = difference in capacity compared to sample with no Ca: i.e., $N_m$ for (85Li, Ca, Na)LSX minus $N_m$ for (85Li, 15Na)LSX; $N_m$ for (Ca, Na)LSX minus $N_m$ for NaLSX.

Additional samples of lithium, calcium, sodium LSX-zeolite were prepared to determine the minimum calcium and lithium exchange levels that are required to observe improved nitrogen capacity of mixed cation lithium, calcium LSX-zeolite over both calcium, sodium LSX-zeolite at the same calcium level and lithium, sodium LSX-zeolite at the same lithium level. The samples were prepared by adding 0.05M $CaCl_2$ and 0.1M NaCl to lithium LSX-zeolite (#8, #9), or 0.05M $CaCl_2$ and 0.1M LiCl to sodium LSX-zeolite (#5, #6, #7), stirring at room temperature for about 2 h, and then filtering with no wash. Elemental analyses and nitrogen capacities are shown in Table V. The nitrogen capacities at 1 atm. for lithium, calcium LSX-zeolite are compared to nitrogen capacities of lithium, sodium LSX-zeolite from Example 1 and calcium, sodium LSX-zeolite from Example 2 at the same lithium and calcium levels, given as reference in the last column of Table V.

TABLE V

Nitrogen Capacity for Mixed Cation (Li, Ca, Na)LSX, after Activation to 400° C., <1 × $10^{-5}$ torr

| sample number | Li/Al eq ratio | Ca/Al eq ratio | Na/Al eq ratio | $N_m$(obs)[1], mmol/g | $N_m$ (ref)[2], mmol/g |
|---|---|---|---|---|---|
| 5 | 0.07 | 0.10 | 0.82 | 0.42 | 0.47 |
| 6 | 0.12 | 0.21 | 0.65 | 0.42 | 0.47 |
| 7 | 0.13 | 0.42 | 0.45 | 0.53 | 0.53 |
| 8 | 0.37 | 0.33 | 0.25 | 0.60 | 0.47 |
| 9 | 0.23 | 0.34 | 0.40 | 0.48 | 0.47 |

[1]$N_m$(obs) = nitrogen capacity at 1 atm. and 23° C.
[2]$N_m$(ref) = $N_2$ capacity of prior art reference material, either (Li, Na)LSX at the same Li exchange level, or (Ca, Na)LSX at the same Ca exchange level, whichever has the greater $N_2$ capacity for samples of 0.47 mmol/g is the average $N_2$ capacity for samples of (Ca, Na)LSX containing 30% Ca or less.

The nitrogen capacity for mixed lithium, calcium LSX-zeolite is greater than the nitrogen capacities both for lithium, sodium LSX-zeolite and calcium, sodium LSX-zeolite only if the sum of the calcium and lithium ion exchange is greater than about 60%, such as observed for samples 1 to 4 and 8 in Tables IV-A and V.

EXAMPLE 5

Calcium, Lithium LSX-Zeolite Binary N₂/O₂ Selectivities

An additional performance factor for air separation adsorbents is $O_2$ product recovery. Unrecovered $O_2$ either coadsorbs with $N_2$ or remains in the voids of the adsorbent bed. The binary $N_2/O_2$ selectivity at feed pressure is an indicator of the recovery losses from coadsorbed $O_2$. This example compares the $N_2/O_2$ selectivities of lithium, calcium LSX-zeolite to the controls, lithium, sodium LSX-zeolite of Example 1 and calcium, sodium LSX-zeolite of Example 2.

$N_2$ and $O_2$ isotherms were obtained to 12000 torr at 23° and 45° C. for the samples described in Example 3 and several control samples from the Examples 1 and 2 using the automated high pressure volumetric adsorption unit as described in Example 4. The isotherm data was fit to the Dual Site Langmuir (DSL) model:

$$N_m = m_1 bP/(1+bP) + m_2 dP/(1+dP)$$

where $N_m$ is the amount adsorbed, P is the pressure, $m_1$ and $m_2$ are the monolayer capacities for sites 1 and 2, respectively, and b and d are the affinity parameters for sites 1 and 2 respectively. The fits were used to generate $N_2$ capacities and isothermal $N_2$ working capacities from 0.2 to 1.2 atm at 23° C. set forth in Table VI. The trends in isothermal $N_2$ working capacities from 0.2 to 1.2 atm are the same as those described above in Example 3 for 0.2 to 1.0 atm. Binary $N_2/O_2$ selectivities were calculated using ideal adsorbed solution theory (IAST) for air feed at 1.45 atmospheres, 30° C., where $N_2/O_2$ selectivity is defined as:

$$\alpha(N_2/O_2) = \frac{N_{N2}/Y_{N2}}{N_{O2}/Y_{O2}}$$

Where
$N_{N2}$ = $N_2$ coadsorbed at $N_2$ partial pressure in the feed
$N_{O2}$ = $O_2$ coadsorbed at $O_2$ partial pressure in the feed
$Y_{N2}$ = mole fraction of $N_2$ in the feed
$Y_{O2}$ = mole fraction of $O_2$ in the feed The binary $N_2/O_2$ selectivities are also included in Table VI.

TABLE VI

Nitrogen Capacity and N₂/O₂ Selectivity for Mixed Cation (Li, Ca)LSX, (Li, Na)LSM, and (Ca, Na)LSX after Activation to 400° C., <1 × 10⁻⁵ torr

| sample number | Li/Al eq ratio | Ca/Al eq ratio | Na/Al eq ratio | $N_m$(obs), mmol/g[1] | $N_m$ (delta), mmol/g[2] | α(N₂/O₂)[3] |
|---|---|---|---|---|---|---|
| 1 | 1.03 | n/a | n/a | 1.46 | 1.14 | 10.0 |
| 2 | 0.94 | 0.10 | n/a | 1.49 | 1.13 | 9.8 |
| 3 | 0.83 | 0.20 | n/a | 1.55 | 1.14 | 9.8 |
| 4 | 0.73 | 0.30 | n/a | 1.57 | 1.10 | 9.9 |
| 5 | 0.59 | 0.41 | n/a | 1.51 | 1.03 | 10.0 |
| 6 | 0.48 | 0.51 | n/a | 1.53 | 1.01 | 9.9 |
| 7 | 0.28 | 0.72 | n/a | 1.59 | 0.95 | 10.4 |
| 8 | n/a | 0.97 | n/a | 1.53 | 0.82 | 10.8 |
| 9 | n/a | n/a | 1.00 | 0.47 | 0.46 | 3.6 |
| 10 | 0.70 | n/a | 0.27 | 0.49 | 0.46 | 4.0 |
| 11 | 0.83 | n/a | 0.20 | 0.75 | 0.65 | 5.7 |
| 12 | n/a | 0.66 | 0.30 | 1.09 | 0.82 | 6.9 |

[1]$N_m$(obs) = nitrogen capacity at 1 atm, 23° C.
[2]$N_m$(delta) = isothermal working capacity from 0 to 0.3 atm at 23° C.
[3]α(N₂/O₂) = N₂/O₂ selectivity for air at 1.45 atm, 30° C., calculated from IAST.

Figure 7:
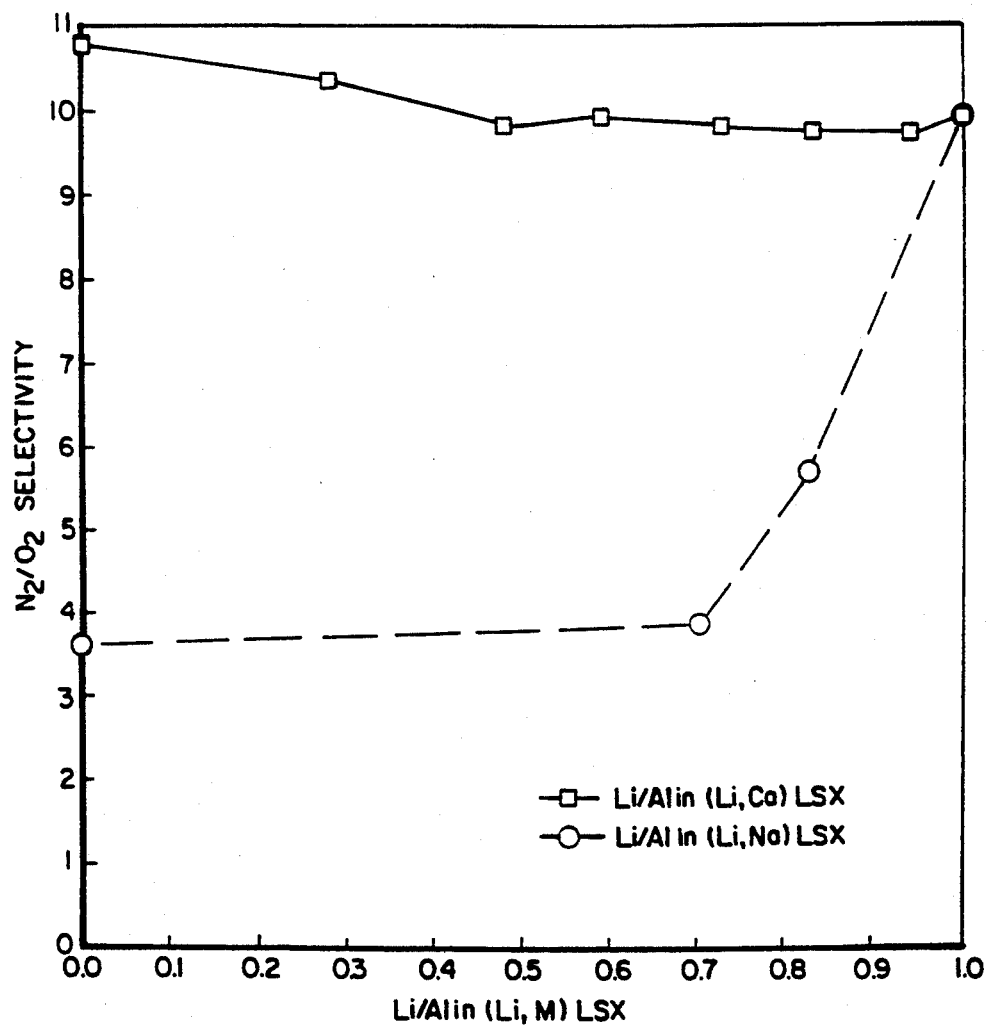
FIG. 7 is a graph of binary $N_2/O_2$ selectivity calculated by IAST for air feed at 1.45 atmospheres at 30° C. for the extent of lithium exchange in a lithium, calcium LSX-zeolite and lithium, sodium LSX-zeolite showing that the binary $N_2/O_2$ selectivities for lithium, calcium LSX-zeolite are higher than the selectivities for lithium, sodium LSX-zeolite at the same lithium exchange level.

FIG. 7 compares the binary $N_2/O_2$ working selectivities for lithium, calcium LSX-zeolite to those for lithium, sodium LSX-zeolite. The selectivity for lithium, calcium LSX-zeolite is higher than that for lithium, sodium LSX-zeolite at the same lithium exchange levels.

Figure 8:
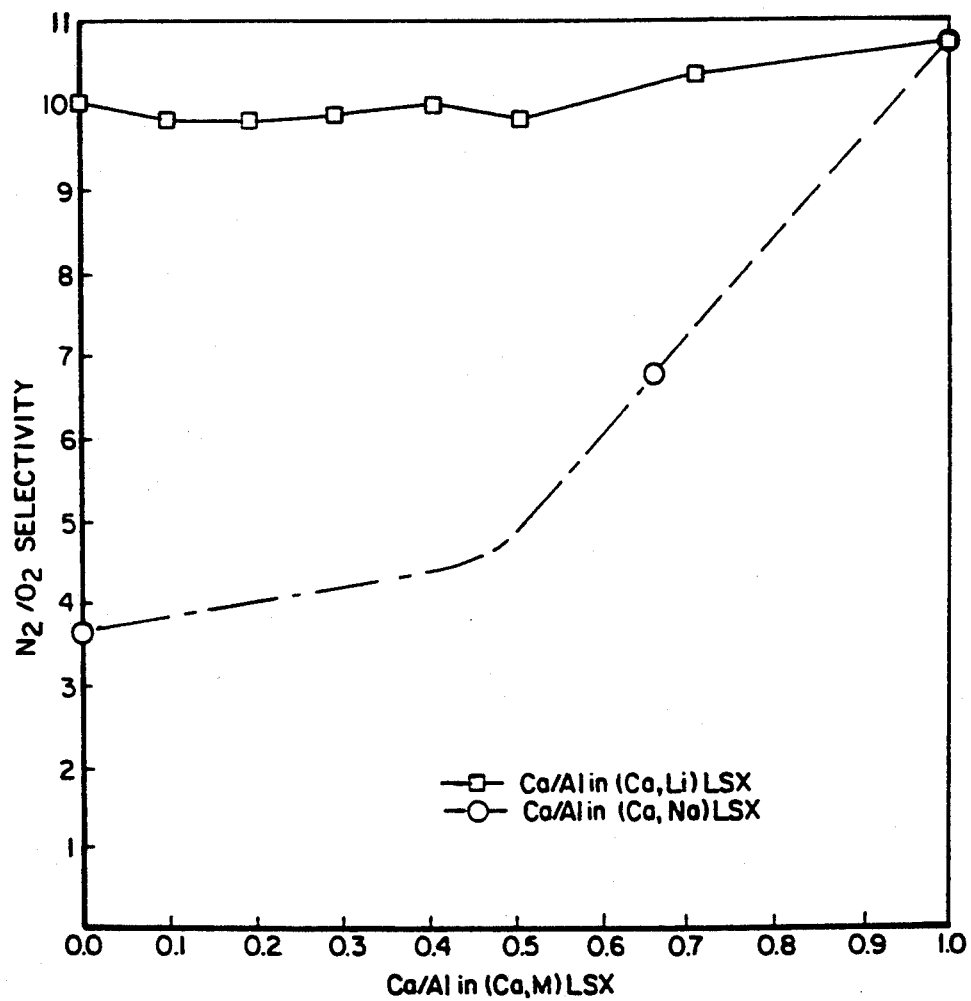
FIG. 8 is a graph of binary $N_2/O_2$ selectivity calculated by IAST for air feed at 1.45 atmospheres, 30° C. for the extent of calcium exchange in a lithium, calcium LSX-zeolite and calcium, sodium LSX-zeolite showing that the binary $N_2/O_2$ selectivities for lithium, calcium LSX-zeolite are higher than the selectivities for sodium, calcium LSX-zeolite at the same calcium exchange level.

FIG. 8 compares the binary $N_2/O_2$ selectivities for lithium, calcium LSX-zeolite to those for calcium, sodium LSX-zeolite. The selectivity for lithium, calcium LSX-zeolite is higher than that for calcium, sodium LSX-zeolite at the same calcium exchange level.

Thus the binary lithium, calcium ion exchanged LSX-zeolites of the present invention exhibit higher $N_2/O_2$ selectivity than that observed for the prior art lithium, sodium LSX-zeolite at the same lithium level and higher than that observed for the prior art calcium, sodium LSX-zeolite at the same calcium level.

EXAMPLE 6

Lithium, Calcium LSX-Zeolite O₂ VSA Equilibrium Process Simulation

This example predicts $O_2$ VSA process performance of lithium, calcium LSX-zeolite adsorbents based on the equilibrium properties of the adsorbents.

$N_2$ and $O_2$ isotherms were obtained to 12000 torr at 23° and 45° C. for the samples in Table VII, derived from Sample #6 of Table VI and Sample 190 1, #3 and Sample #4 of Table IV-A, the sample of Example 7, and a commercial 5A-zeolite, respectively, using the automated high pressure volumetric adsorption unit described in Example 4.

The $O_2$ isotherms were fit to the Langmuir model with heat effects; i.e. $b = b_o \exp(Q/RT)$ where $b_o$ is the affinity parameter at infinite temperature and Q is the temperature dependence of the affinity parameter, and the $N_2$ isotherms were fit to the Sircar-Jovanovic model:

$$N_m = m(1 - (1 + PK/mb)^{-b})$$

$$K = K_o \exp(Q_k/RT)$$

$$b = b_o \exp(Q_b/RT)$$

where $N_m$ is the amount adsorbed, P is the pressure, T is the absolute temperature, R is the gas constant, m is the maximum loading, $K_o$ is the Henry's constant at infinite temperature, $Q_k$ is the temperature dependence of the Henry's constant, $b_o$ is the heterogeneous parameter at infinite temperature, and $Q_b$ is the temperature dependence of the heterogeneous parameter. Binary equilibria were calculated using ideal adsorbed solution theory (IAST) described by A. L. Meyers and J. M. Prausnitz in the American Institute of Chemical Engineers Journal, vol. 11, p. 121.

A computer process model was used to simulate a standard $O_2$ VSA process cycle at chosen pressures and end of feed temperature. The model is based on global equilibrium; i.e., it assumes no spatial concentration gradients and complete bed utilization, and is referred to as GEM. Multicomponent equilibria are estimated by IAST, and heat effects are included. Input for the program include isotherms for $N_2$ and $O_2$ at two temperatures, and adsorbent physical properties (bulk density, void volume, and heat capacity).

The three major performance factors obtained from the simulations were Bed Size Factor (BSF), Recovery of $O_2$, and Actual Cubic Feet evacuated/lbmol Evacuation gas (ACF/Evac). Lower BSF, higher Recovery, and lower ACF/Evac indicate improved performance.

Table VII contains the results of the process simulations for an $O_2$ VSA process cycle with a feed pressure of 1000 Torr and an evacuation pressure of 300 Torr for several calcium, lithium LSX-zeolites, a sodium, lithium LSX-zeolite control, and a typical commercial 5A zeolite used for air separation. The Recovery, BSF, and ACF/Evac for each adsorbent are normalized to a value of 1.0 for the commercial 5A zeolite. At 75° F. end of feed temperature, the lithium, calcium LSX-zeolites perform significantly better than the commercial 5A zeolite. The lithium, calcium LSX-zeolites have significantly higher recovery and lower BSF than the commercial 5A zeolite, and only moderately higher ACF/Evac. At 75° F., the lithium, calcium and lithium, calcium, sodium LSX-zeolites containing 85% lithium perform better than the lithium, sodium LSX-zeolite control containing 85% lithium. They have equal to better recovery, lower BSF, and only minimally higher ACF/Evac. At 105° F., the lithium, calcium and lithium, calcium, sodium LSX-zeolites containing 85% lithium perform significantly better than the lithium, sodium LSX-zeolite control containing 85% lithium. They have higher recovery, significantly lower BSF, and only minimally higher ACF/Evac.

TABLE VII

| Sample Number | Sample Identity | End of Feed Temp. F | Relative Recovery | Relative BSF | Relative ACF/Evac |
|---|---|---|---|---|---|
| 1 | Commercial 5A | 75 | 1.00 | 1.00 | 1.00 |
| 2 | 50%(Ca, Li)LSX | 75 | 1.15 | 0.72 | 1.05 |
| 3 | 33%(Ca, Li)LSX /clay | 75 | 1.19 | 0.70 | 1.05 |
| 4 | 15%(Ca, Li)LSX | 75 | 1.25 | 0.59 | 1.08 |
| 5 | (85Li, 10Na, 05Ca)LSX | 75 | 1.24 | 0.64 | 1.06 |
| 6 | 15%(Na, Li)LSX | 75 | 1.24 | 0.65 | 1.05 |
| 4 | 15%(Ca, Li)LSX | 105 | 1.30 | 0.61 | 1.15 |
| 5 | (85Li, 10Na, 05Ca)LSX | 105 | 1.27 | 0.71 | 1.12 |
| 6 | 15%(Na, Li)LSX | 105 | 1.24 | 0.78 | 1.10 |

EXAMPLE 7

Lithium, Calcium LSX-zeolite $O_2$ VSA Equilibrium Process Simulation Effect of Temperature A lithium, 33% calcium LSX-zeolite was prepared from sodium, potassium LSX-zeolite powder derived from clay by adding lithium LSX-zeolite to a stoichiometric amount of 0.5 molar calcium chloride, heating at 100° C. for 16 h, filtering, and washing with water. Elemental analysis indicated a lithium/aluminum equivalent ratio of 0.60 and a calcium/aluminum equivalent ratio of 0.34.

The effect of temperature on process performance was evaluated for the adsorbent using the methods described in Example 6. $O_2$ VSA performance was simulated at end of feed temperatures from 55° to 135° F. Table VIII contains the recovery, BSF, and ACF/Evac normalized to the results at 55° F. Lithium, calcium LSX-zeolite demonstrates the unexpected beneficial effects of higher recovery at temperatures up to 135° F. and lower BSF at temperatures up to greater than 95° F. in $O_2$ VSA. This example demonstrates an added benefit of the lithium, calcium LSX-zeolites of the present invention in that they do not display the deterioration in performance with increasing temperature observed for the prior art lithium, sodium LSX-zeolites in $O_2$ VSA processes. For the family of lithium, calcium LSX-zeolites, those with higher levels of calcium would appear to benefit more from higher temperatures.

TABLE VIII $O_2$ VSA GEM Process Simulations:
Effect of Temperature on 33% Calcium, Lithium LSX-Zeolite

| Temp, °F. | Relative Recovery | Relative BSF | Relative ACF/Evac |
|---|---|---|---|
| 55 | 1.00 | 1.00 | 1.00 |
| 75 | 1.05 | 0.95 | 1.07 |
| 95 | 1.08 | 0.94 | 1.13 |
| 115 | 1.10 | 0.97 | 1.16 |
| 135 | 1.10 | 1.07 | 1.18 |

EXAMPLE 8

Lithium, Calcium LSX-Zeolite $O_2$ VSA Equilibrium Process Simulation Effect of Diluting the Zeolitic Phase Although the results presented above were obtained using zeolite powders, it is understood that in a typical PSA process one would use some sort of formed material, such as pellets or beads. Since the forming process often requires the use of an inert binder to provide adequate physical strength and attrition resistance, it is important to determine the effect of binder on performance.

The performance of 85% lithium, calcium LSX-zeolite (Sample #1 of Table IV-A) was simulated using the GEM model described above in Example 6. The material was evaluated with no binder, a typical formulation of 80% zeolite/20% binder, and 49% zeolite/51% binder. The presence of binder was accounted for by multiplying the M's (monolayer coverages) in the isotherm fits by the percent zeolite. The formulations were evaluated at an end of feed temperature of 75° F., and Table IX contains the resulting Recovery, BSF, and ACF/evac. As expected, BSF increases with increasing binder, but much less than expected if there were no benefits for dilution. The expected increases in BSF are 25% for 20% binder and 100% for 50% binder, whereas the observed increases in BSF are 10% for 20% binder and 45% for 51% binder. Even more unexpected is the increase in recovery and the decrease in ACF/lb mol evac with increasing binder.

TABLE IX

GEM Predictions for 85% Lithium, Calcium LSX-zeolite Containing Different Amounts of Binder.

| % Binder | Temp @ end of Evac (°F.) | Relative Delta T | Relative Recovery | Relative BSF | Relative ACF/Evac |
|---|---|---|---|---|---|
| Binderless | 55.1 | 1.000 | 1.000 | 1.000 | 1.000 |
| 20% Binder | 57.7 | 0.873 | 1.019 | 1.104 | 0.977 |

TABLE IX-continued

| | GEM Predictions for 85% Lithium, Calcium LSX-zeolite Containing Different Amounts of Binder. | | | | |
|---|---|---|---|---|---|
| % Binder | Temp @ end of Evac (°F.) | Relative Delta T | Relative Recovery | Relative BSF | Relative ACF/ Evac |
| 51% Binder | 62.6 | 0.623 | 1.024 | 1.452 | 0.928 |

These results were totally unexpected based on the prior art. Those skilled in the art have generally believed that the addition of binder reduces the adsorptive properties of zeolitic materials. In the past, the trend has been to try to reduce the levels of binder from the typical 20% to as low as possible, often as low as 5%, or even to eliminate the binder entirely.

This example demonstrates that it is preferred to use these materials diluted (with binder) in standard $O_2$ VSA cycles.

EXAMPLE 9

Lithium, Strontium LSX-Zeolite $N_2$ Capacities

Strontium LSX-zeolite was prepared by ion exchange of sodium, potassium LSX-zeolite using four static exchanges at 100° C. with a 3.8-fold equivalent excess of 1.0M $Sr(NO_3)_2$ adjusted to a pH of about 7 using $Sr(OH)_2$. Two samples of lithium, strontium LSX-zeolite were prepared by adding lithium LSX-zeolite powder to various amounts of 0.05M $Sr(NO_3)_2$ adjusted to a pH of about 7 using 0.1M LiOH and stirring at room temperature for about 4 h. The mixed cation samples were filtered, but not washed. Table X contains the results of elemental analyses for strontium and lithium and $N_2$ capacities and binary $N_2/O_2$ selectivities obtained as described in Example 5.

Figure 4:
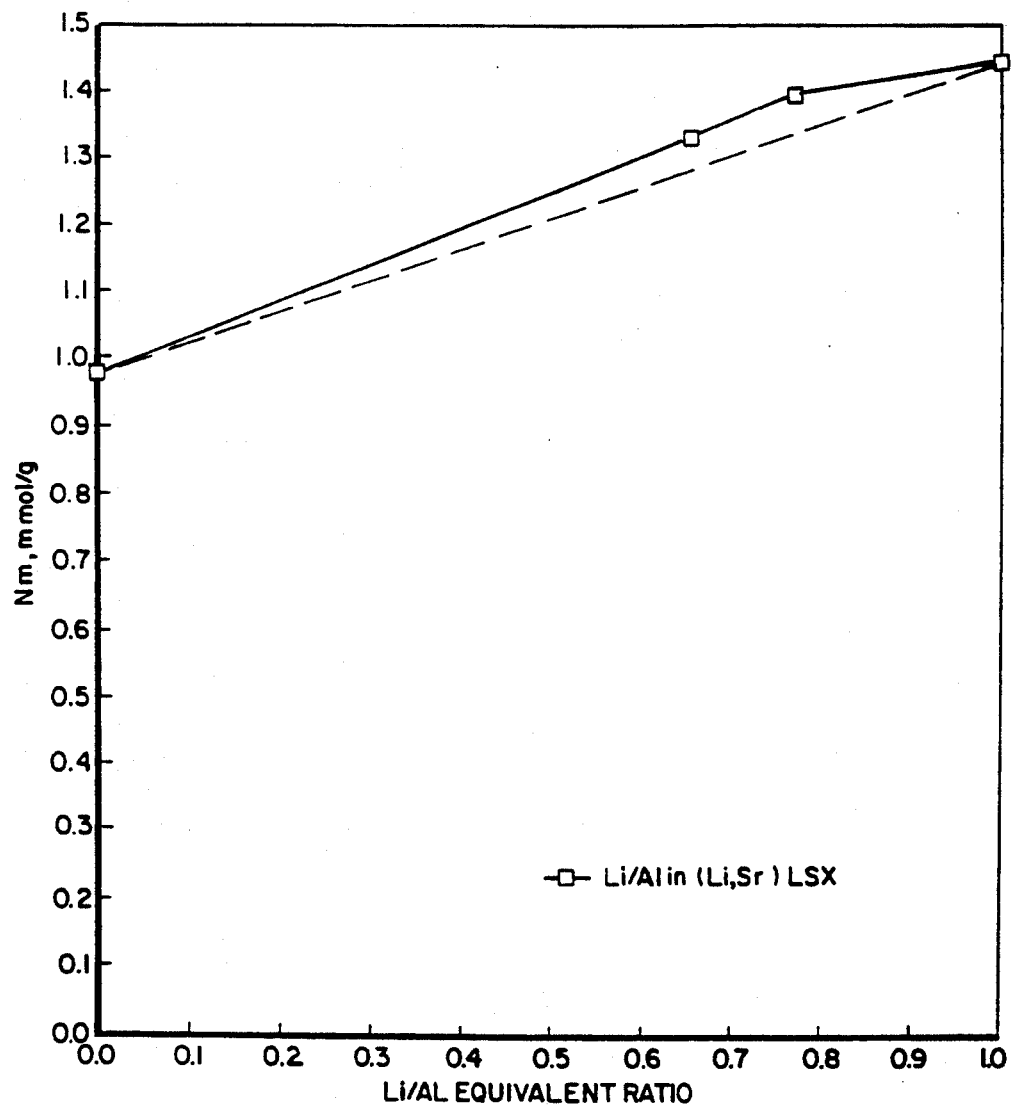
FIG. 4 is a graph of nitrogen capacity for the extent of lithium exchange in a lithium, strontium LSX-zeolite at 1 atmosphere and 23° C. showing that capacity uniformly and unexpectedly is in excess of what might be expected from straight line extrapolation of 100% strontium to 100% lithium ion content.

FIG. 4 is a graph of nitrogen capacity at 1 atmosphere and 23° C. for the extent of lithium exchange in lithium, strontium LSX-zeolite. It shows that capacity uniformly and unexpectedly is in excess of what might be expected from straight line extrapolation of 100% strontium to 100% lithium ion content.

As observed for the mixed lithium, calcium LSX-zeolites, the $N_2$ capacities, isothermal nitrogen working capacities and binary $N_2/O_2$ selectivities for mixed lithium, strontium LSX-zeolites are significantly higher than those for lithium, sodium LSX-zeolites at the same lithium exchange level. Thus divalent alkaline earth metal cations other than $Ca^{2+}$ also show unexpectedly high capacity in admixture with lithium.

TABLE X

| | Nitrogen Capacity and $N_2/O_2$ Selectivity for Mixed Cation (Li, Sr)LSX after Activation to 400° C., <1 × 10$^{-5}$ torr | | | | |
|---|---|---|---|---|---|
| sample number | Li/Al eq ratio | Sr/Al eq ratio | $N_m$(obs)[1] mmol/g | $N_m$(delta)[2] mmol/g | α $(N_2/O_2)$[3] |
| 1 | 1.03 | n/a | 1.46 | 1.14 | 10.0 |
| 2 | 0.77 | 0.20 | 1.41 | 1.08 | 8.91 |
| 3 | 0.66 | 0.30 | 1.34 | 1.03 | 8.32 |
| 4 | n/a | 1.07 | 0.98 | 0.77 | 5.85 |

[1]$N_m$(obs) = nitrogen capacity at 1 atm. 23° C.
[2]$N_m$(delta) = isothermal working capacity from 0.2 to 1.2 atm
[3]α$(N_2/O_2)$ = binary $N_2/O_2$ selectivity for air at 1.45 atm, 30° C.

EXAMPLE 10

Lithium, Potassium LSX-Zeolite Control

Several samples of lithium, potassium LSX-zeolite were prepared by adding lithium LSX-zeolite powder to varying amounts of 0.1M KCl and stirring at room temperature for about 4 h. The samples were filtered but not washed. Table XI contains the results of elemental analyses for lithium and potassium and nitrogen capacities obtained as described in Example 4.

TABLE XI

| | Nitrogen Capacity for Mixed Cation (Li, K)LSX containing about 85% Li, after Activation to 400° C., <1 × 10$^{-5}$ torr | | | |
|---|---|---|---|---|
| sample number | Li/Al eq ratio | K/Al eq ratio | $N_m$(calc), mmol/g[1] | $N_m$(obs), mmol/g[2] |
| 1 | 1.03 | 0.00 | 1.35 | 1.35 |
| 2 | 0.87 | 0.10 | 1.24 | 0.96 |
| 3 | 0.79 | 0.19 | 1.15 | 0.61 |
| 4 | n/a | 0.98 | 0.26 | 0.26 |

[1]$N_m$(calc) = 1.354*Li/(Li + K) + 0.263*K/(Li + K), calculated $N_2$ capacity at 1 atm., 23° C., based on the capacities of the two end members.
[2]$N_m$(obs) = nitrogen capacity at 1 atm., 23° C.

The $N_2$ capacity of lithium, potassium LSX-zeolite decreases significantly with addition of potassium to 10 and 20% levels, similar to the behavior of lithium, sodium LSX-zeolite. In addition, the observed capacity ($N_m$(obs)) is significantly less than what might be expected ($N_m$(calc)) from a straight line extrapolation of 100% potassium to 100% lithium content. This control further supports the unique result obtained for lithium in admixture with calcium as compared to lithium in admixture with monovalent alkali metal cations.

EXAMPLE 11

Lithium, Calcium, Potassium LSX-Zeolite $N_2$ Capacities

Three samples of lithium, calcium, potassium LSX-zeolite were prepared by adding lithium LSX-zeolite powder to various amounts of 0.1N solution containing various amounts of $CaCl_2$ and KCl and stirring at room temperature for about 4 h. The samples were filtered but not washed. Table XII contains the results of elemental analyses of lithium, calcium and potassium and $N_2$ capacity at 1 atm obtained as described in Example 4.

TABLE XII

| | Nitrogen Capacity for Mixed Cation (Li, Ca, K)LSX Containing about 85% Lithium after Activation to 400° C., <1 × 10$^{-5}$ torr | | | |
|---|---|---|---|---|
| sample number | Li/Al eq ratio | Ca/Al eq ratio | K/Al eq ratio | $N_m$(obs),[1] mmol/g |
| 1 | 0.83 | 0.16 | 0.00 | 1.47 |
| 2 | 0.80 | 0.10 | 0.05 | 1.22 |
| 3 | 0.82 | 0.05 | 0.10 | 0.97 |

[1]$N_m$(obs) = Nitrogen capacity at 1 atm., 23° C.

Calcium displacing potassium in 85% lithium, potassium LSX-zeolite significantly increases the $N_2$ capacity. For comparison, 85 Li/15K uptake is 0.78 mmol/g, determined by interpolating between values for 80 Li/20K and 90 Li/10K, the control samples in Example 10. Even small amounts of calcium have an effect: 5% calcium increases the $N_2$ capacity by 0.19 mmol/g from 0.78 mmol/g to 0.97 mmol/g. This example demonstrates the beneficial effect of lithium in combination with calcium for other ternary ion exchanged forms that contain potassium instead of sodium in addition to lithium and calcium.

EXAMPLE 12

Lithium, Calcium and Lithium, Strontium X-Zeolite $N_2$ Capacities

Lithium X-zeolite was prepared from Linde 13X (sodium X-zeolite) using five static exchanges at 100° C. with a 5.6-fold equivalent excess of 1.1M LiCl. Two samples of lithium, calcium X-zeolite and one sample of lithium, strontium X-zeolite were prepared by adding lithium X-zeolite powder to either 0.05M $CaCl_2$ or 0.05M $Sr(NO_3)_2$, respectively, and stirring at room temperature for about 4 h. The mixed cation samples were filtered, but not washed. Table XIII contains the results of elemental analyses for lithium, calcium and strontium and $N_2$ capacity at 700 torr obtained as described in Example 4.

TABLE XIII

Nitrogen Capacity for Mixed Cation (Li, Ca)X and (Li, Sr)X after Activation to 400° C., $<1 \times 10^{-5}$ torr

| sample number | Li/Al eq ratio | Ca/Al eq ratio | Sr/Al eq ratio | Na/Al eq ratio | $N_m$(obs), mmol/g[1] |
|---|---|---|---|---|---|
| 1 | 0.98 | n/a | n/a | 0.04 | 1.00 |
| 2 | 0.70 | 0.22 | n/a | 0.04 | 0.94 |
| 3 | 0.52 | 0.37 | n/a | 0.03 | 0.96 |
| 4 | 0.68 | n/a | 0.34 | 0.03 | 0.88 |

[1]$N_m$(obs) = Nitrogen capacity at 0.9 atm., 23° C.

FIG. 9 compares the $N_2$ capacity at 700 torr, 23° C., for the lithium, calcium and lithium, strontium binary ion exchanged forms of X-zeolite powder to data presented for the lithium, sodium binary ion exchanged forms of "binderless" X-zeolite in U.S. Pat. No. 4,859,217. The $N_2$ capacities for lithium, calcium X-zeolite and lithium, strontium X-zeolite are higher than the $N_2$ capacities for lithium, sodium X-zeolite at the same lithium exchange level.

This example demonstrates that the unexpected result observed for X-zeolite containing a Si/Al=1 (LSX-zeolite) is also observed for X-zeolite at higher Si/Al ratios such as 1.2. It also supports Example 9 in that it demonstrates that divalent alkaline earth metal cations other than $Ca^{2+}$ also show unexpectedly high capacity in admixture with lithium.

EXAMPLE 13

Lithium, Calcium LSX-Zeolite Extrudate Flow Activation

A sample of lithium, calcium LSX-zeolite extrudate was prepared by six static ion exchanges of calcium, sodium LSX-zeolite extrudate with 2.2M LiCl at 100° C. Two flow activation experimental runs were performed in the following manner. A 30 cc portion of the lithium, calcium exchanged extrudate was placed in a 1-in diameter stainless steel sample cylinder, which was placed in a tube furnace. In order to activate the sample, gas flow was initiated through the sample, and the furnace temperature was controlled with a programmable temperature controller (flow activation). Two 30 cc sample portions were flow activated as follows:

| Run #1: | $N_2$ at 1.3 L/min, heated at 2° C./min to 400° C. and held at 400° C. for 4 h. Final dew point of exit gas = −20° C. |
|---|---|
| Run #2: | Step 1: Breathing air (contains $CO_2$) flowing at 2.6 L/min saturated with $H_2O$ at room temperature, heated at 10° C./min to 120° C. and held for 2 h 40 min. |
| | Step 2: $N_2$ at 1.3 L/min, heated at 10° C./min to 400° C. and held 400° C. for 4 h 30 min. Final dew point of the exit gas = −45° C. |

At the end of the sample activation, valves at the ends of the sample cylinder were closed, the sample was allowed to cool, and then evacuated. $N_2$ isotherms to 100 psig were obtained on a volumetric isotherm unit at 30° C. controlled with an air temperature bath. A third portion of the extrudate was vacuum activated as described in Example 4. The nitrogen capacities at 1 atm and 30° C. for the flow activated samples were compared below to that obtained on the volumetric isotherm unit for the vacuum activated sample.

| Sample | $N_2$ Capacity at 1 atm, 30° C. |
|---|---|
| vacuum activated | 0.93 mmol/g |
| flow activated (run #1) | 0.90 mmol/g |
| flow activated (run #2) | 0.91 mmol/g |

This example demonstrates that mixed cation lithium, calcium LSX-zeolite adsorbents can be activated either by vacuum or in the absence of vacuum, provided that the gas composition, flow rate and temperature ramp are controlled to limit the presence of $H_2O$ and $CO_2$ in the atmosphere.

EXAMPLE 14

Lithium, Calcium LSX-Zeolite Effect Of Order Of Exchange Of Cations On $N_2$ Capacity A sample of lithium, calcium LSX-zeolite was prepared by lithium ion exchange of calcium LSX-zeolite powder using six static exchanges at 100° C. with a 6.3-fold equivalent excess of 2.2M LiCl. Elemental analysis of the sample gave a Li/Al equivalent ratio of 0.70 and a Ca/Al equivalent ratio of 0.25. The following $N_2$ capacities at 23° C. were obtained as described in Example 4:

| $N_m$(obs): | 1.33 mmol/g |
|---|---|
| $N_m$(delta): | 0.98 mmol/g |

Thus lithium, calcium LSX-zeolite prepared by lithium exchange of calcium LSX-zeolite shows the same improvement in adsorptive properties compared to lithium, sodium LSX-zeolite and calcium, sodium LSX-zeolite, as demonstrated by lithium, calcium LSX-zeolite prepared by calcium exchange of lithium LSX-zeolite.

The method of ion exchange is not limited to the procedures described above. The same compositions prepared by other ion exchange routes should perform essentially the same as the materials reported herein.

The lithium, calcium X-zeolite adsorbents of the present invention exhibit some unexpected and remarkable performance characteristics when used to selectively adsorb nitrogen from gas mixtures containing nitrogen in contrast to other adsorbents containing lithium or calcium used for such nitrogen adsorption processes. In particular, the $N_2$ capacity of mixed cation lithium, calcium LSX-zeolite exceeds what might be expected from a straight line extrapolation of the capacities of the end members. This unexpected result is in marked contrast to the relevant prior art materials, calcium, sodium LSX-zeolite or lithium, sodium LSX-zeolite. In addition, both the nitrogen working capacity and the nitrogen/oxygen selectivity of the at least binary ion exchanged X-zeolites of the present invention are higher than those observed for the prior art lithium, sodium X-zeolites at the same lithium level and higher than those observed for the prior art calcium, sodium X-zeolites at the same calcium level. Even small amounts of calcium have a significant effect, as observed by significant increases in $N_2$ capacity as a result of displacing sodium with calcium in lithium, sodium LSX-zeolite, as compared to no change in $N_2$ capacity as a result of displacing sodium with calcium in sodium LSX-zeolite. In addition to the improved adsorptive properties of the adsorbents of the present invention, these materials exhibit some unexpected performance in $O_2$ VSA process simulations. Specifically, VSA performance improves with increasing temperature above ambient, whereas the prior art lithium, sodium X-zeolites deteriorate in performance with increasing temperature. VSA performance of lithium, calcium X-zeolites also surprisingly improves with dilution of the zeolitic phase to levels above those typically used for binding zeolites for granulation purposes.

The present invention has been set forth with reference to several preferred embodiments. However, the full scope of the invention should be ascertained from the claims which follow.

We claim:

1. A process for selectively adsorbing nitrogen from a gas mixture containing nitrogen and at least one less strongly adsorbed component which comprises contacting the gas mixture with a zone of an adsorbent which is selective for the adsorption of nitrogen, selectively adsorbing nitrogen on the adsorbent and passing the gas mixture less the adsorbed nitrogen out of the zone, wherein the adsorbent comprises a crystalline X-zeolite having a zeolitic Si/Al ratio $\leq 1.5$ and an at least binary ion exchange of the exchangeable ion content with between 5% and 95% lithium and with between 5% and 95% of a second ion selected from the group consisting of calcium, strontium and mixtures thereof, wherein the sum of the lithium and second ion ion exchange is at least 60% of the exchangeable ion content.

2. The process of claim 1 wherein the zeolite is ion exchanged with lithium to approximately 50% to 95%.

3. The process of claim 1 wherein the zeolite is ion exchanged with the second ion to approximately 5% to 50%.

4. The process of claim 1 wherein the zeolite is ion exchanged with approximately 15% of the second ion and 85% lithium.

5. The process of claim 1 wherein the second ion is calcium.

6. The process of claim 1 wherein the second ion is strontium.

7. The process of claim 1 wherein the zeolite is ion exchanged with approximately 15% calcium and 85% lithium.

8. The process of claim 1 wherein the gas mixture contains nitrogen and oxygen.

9. The process of claim 1 wherein the gas mixture is air.

10. The process of claim 1 wherein the Si/Al ratio is approximately 1.

11. The process of claim 1 wherein an oxygen and nitrogen containing gas mixture contacts a zone of said adsorbent, the nitrogen is selectively adsorbed and the oxygen passes through the zone and is recovered as an oxygen enriched product.

12. The process of claim 11 wherein the oxygen product has a purity of at least approximately 90% oxygen.

13. The process of claim 11 wherein the adsorption is conducted at an average bed temperature in the range of approximately 55 to 135° F.

14. The process of claim 11 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; and repressurization with oxygen product to the adsorption pressure.

15. The process of claim 14 wherein the adsorption pressure is in the range of approximately 35 to 65 psia.

16. The process of claim 14 wherein the desorption is conducted down to a pressure in the range of approximately 14.7 to 16.7 psia.

17. The process of claim 11 wherein the zone is operated through a series of steps comprising: adsorption during which the gas mixture contacts the adsorbent, nitrogen is selectively adsorbed and oxygen passes through the zone as a product; depressurization during which the gas mixture contact is discontinued and the zone is reduced in pressure to desorb the nitrogen; evacuation to further desorb the nitrogen to below ambient pressure; and repressurization with oxygen product to the adsorption pressure.

18. The process of claim 17 wherein the adsorption pressure is in the range of approximately 900 to 1600 torr.

19. The process of claim 17 wherein the evacuation is conducted down to a level in the range of approximately 80 to 400 torr.

* * * * *